United States Patent [19]

Prince et al.

[11] Patent Number: 4,516,731

[45] Date of Patent: May 14, 1985

[54] DEBONING APPARATUS HAVING AUGER SEAL ON ONE END AND SUPPORT MEANS THEREFOR

[75] Inventors: Jack A. Prince; Bobby D. Standridge, both of Gainesville, Ga.

[73] Assignee: Jack Prince, Inc., Gainesville, Ga.

[21] Appl. No.: 431,544

[22] Filed: Sep. 30, 1982

[51] Int. Cl.³ .................. B02C 19/22; B02C 23/16
[52] U.S. Cl. .................................... 241/24; 241/74; 241/82.3; 241/260.1
[58] Field of Search .............. 425/376 R; 366/322, 366/323, 324, 320; 241/82.1–82.7, 74, 24, 30; 277/203, 214, 215

[56] References Cited

U.S. PATENT DOCUMENTS

| | | | |
|---|---|---|---|
| 4,103,354 | 7/1978 | Gorbatou et al. | 366/322 X |
| 4,103,355 | 7/1978 | Weber | 366/322 X |
| 4,303,206 | 12/1981 | Prince et al. | 241/82.3 X |
| 4,304,054 | 12/1981 | Nauck | 366/322 X |

FOREIGN PATENT DOCUMENTS

| | | | |
|---|---|---|---|
| 192612 | 10/1957 | Fed. Rep. of Germany | 366/323 |
| 363236 | 8/1962 | Switzerland. | |

*Primary Examiner*—Mark Rosenbaum
*Attorney, Agent, or Firm*—Patrick F. Henry

[57] ABSTRACT

A deboning apparatus having an internal seal for the end of the auger comprising a circular flange having slots therein for directing fluids away from the seal. The end of the auger is supported in a bearing assembly held in place by a cap which is bolted to a flange on the auger housing and to spaced, opposed columns. There is also an extra flight on the opposite end of the auger near the exit end for the bone and the end of each flight has a square tip.

18 Claims, 6 Drawing Figures

DEBONING APPARATUS HAVING AUGER SEAL ON ONE END AND SUPPORT MEANS THEREFOR

BACKGROUND OF THE INVENTION

1. Field of the Invention

The field of the invention is the same as that found in prior U.S. Pat. No. 4,303,206 which is solid material comminution or disintregation and particularly processes and machines having classification or separation of material and apparatus utilizing an arcuate screen concentric with a rotary comminuting member.

2. Discussion of Prior Machines

The present machine is a variation from the one disclosed in prior U.S. Pat. No. 4,303,206 and provides a different way of supporting the end of the auger near the product inlet and does away with the removable actuator threaded on top of the body and the locking lever assembly and other parts and arrangement therein. While the previous arrangement performed satisfactorily sometimes there is a tendency for the seal on the end of the auger to leak due to the force of the liquid and there is also some expense and inconvenience in the mounting and supporting of the end of the auger. The auger of the present machine is provided with a circular flanged portion within the housing and adjacent to the rubber coated seal functioning to interrupt the flow of liquids toward the seal and in addition, the flange is provided on the inner surface with a plurality of slots which serve to interrupt and direct the fluid thereby improving the seal and reducing the loss of fluid and pressure. The end of the auger is supported in a bearing arrangement which is bolted by means of an end cap to the auger housing to fasten the auger housing to the spaced columns which are mounted on the base plate.

The auger itself is provided with an additional flight near the bone exit comprising an additional helical member the same as the other helical member on the auger but positioned in between two previously existing helical members in order to provide a better flow of material. The ends of the two helical auger members are square.

SUMMARY OF THE INVENTION

The invention comprises a fluid interrupting and directing means mounted on the auger inside the housing next to the seal which may be provided with recessed slots in the face on the periphery thereof to interrupt the flow of fluids. The end of the auger is supported in a bearing arrangement by means of an end cap bolted to the auger housing and to support columns mounted on the base.

The auger may be provided with an additional flight comprising an additional helical member near the bone exit.

FIG. 4 is a plan view of the housing supporting the upper end of the auger, with the end cap, bearings and auger removed.

DESCRIPTION OF A PREFERRED EMBODIMENT

Figure 1:
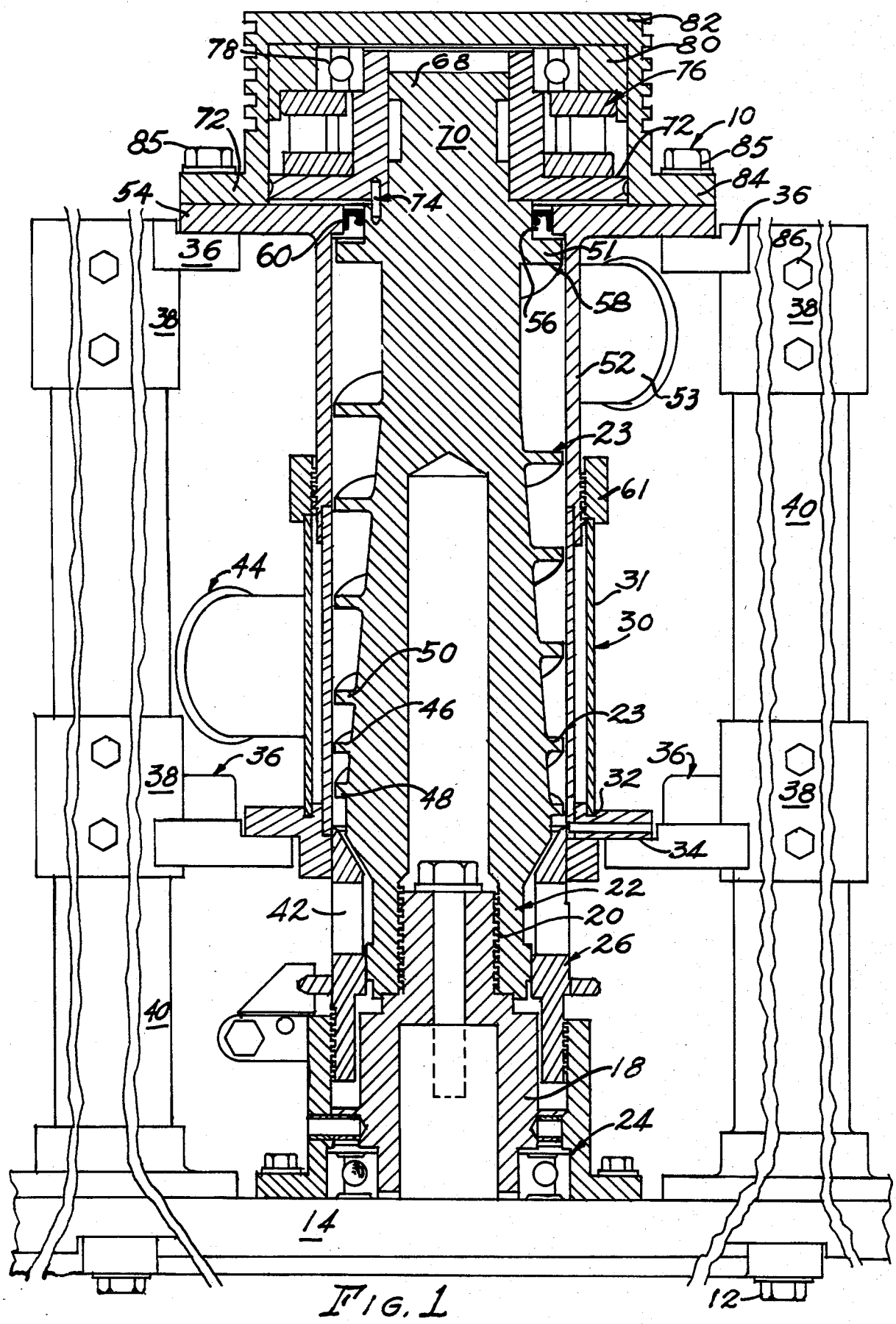
FIG. 1 is an elevation view of the machine with the auger and related structure shown substantially in medial, vertical cross-section.

Referring initially to FIG. 1, the general arrangement of the machine which does not per se form a part of the claimed invention is similar to the machine shown in my U.S. Pat. No. 4,303,206 and the machine 10 is mounted on a floor support base (not shown) by means of adjustment screws 12 attached to a base plate 14 which supports a large electrical motor (not shown) having a motor drive coupling (not shown). The drive coupling (not shown) is attached to a cylindrical adapter 18 having a threaded collar 20 on which is threadedly mounted an auger 22 having auger blades 23 defined by a helix which provides a flight (or flite) each 360° of the helix on the auger 22. A bearing assembly and arrangement 24 is provided at the bottom of the auger 22 on base plate 14 to support the auger for rotation thereon in the manner similar to that described in my previous U.S. Pat. No. 4,303,206. There is a compression ring arrangement 26 provided with a tapered bore to be adjusted in engagement with the interior of a stainless steel housing 30 and screen arrangement 31 which is mounted on a mounting collar 32 having flanges 34 which are bolted to supports 36 having collars 38 which are attached about vertical columns 40 that are mounted on and attached to base plate 14.

There is a bone exit 42 and a meat exit 44 leading from the perforated screen.

Figure 5:
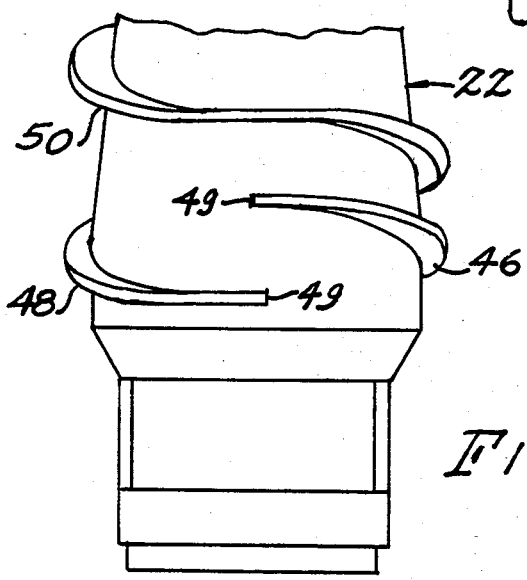
FIG. 5 is a side elevation view of the lower or bottom end of the auger near the discharge end showing the added flight.

As an improvement in the previous arrangement, the auger is provided with an additional blade 46 (See FIGS. 1 and 5) which is an additional flite (or flight) extending 180° between two previous flites and blades 48, 50 of the previous auger arrangement. The added flight 46 in one specific example is spaced from the blades 48, 50 approximately one inch. The tip 49 of blade 48 is square. Tips of blade 46 are also square to assist removal.

Figure 2:
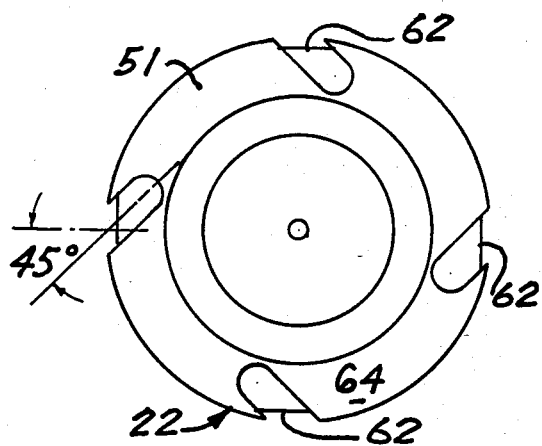
FIG. 2 is an elevation view of the slotted plate on the entrance end of the auger next to the seal.
Figure 3:
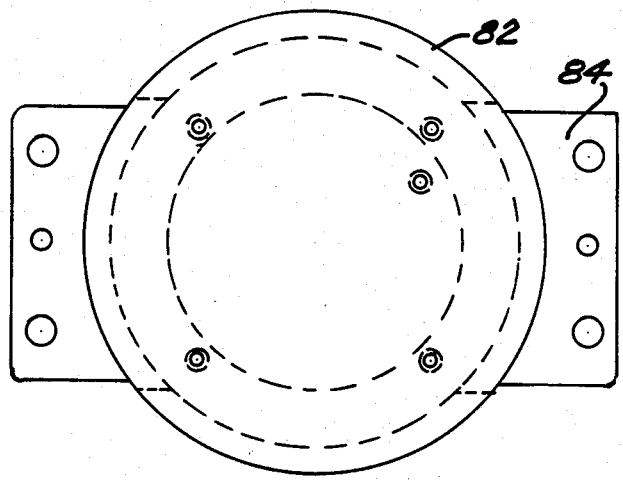
FIG. 3 is a top plan view of the end cap on the upper end of the machine in FIG. 1.
Figure 6:
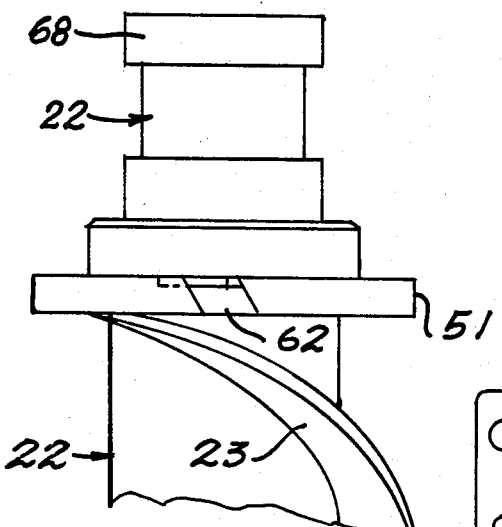
FIG. 6 is a partial elevation view in full lines of the upper part of the auger.
Figure 4:
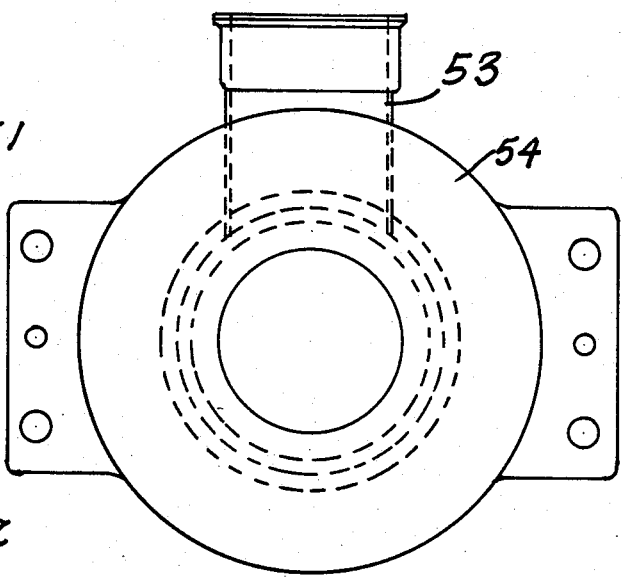
FIG. 4 is a plan view of the housing supporting the upper end of the machine in FIG. 1.

In my previous machine in U.S. Pat. No. 4,303,206, the auger had its upper end rotating in a collar on a bearing assembly and held in place by a cap on another collar. The space next to one collar is sealed by gasket. Due to the constant amount of pressure from fluids sometimes the gasket would leak. In the present arrangement the auger 22 is provided with a fluid director in the form of circular flanged portion 51 supported for rotation with the auger 22 inside the product inlet sleeve 52 having product inlet 53. Product inlet sleeve 52 is provided with a fixed flange in the form of a circular collar 54 defining a space 56 (FIG. 1) with the upper circular end 58 of auger 22 and a circular rubber coated seal 60 is provided in this space. The flanged portion 51 is provided with four slots or grooves 62 which are milled at an angle of 45 degrees from the starting point of the auger flighting 23 a distance into the face 64 of the flanged portion 51 in the manner shown in FIG. 2. The first slot 62 is 45° approximately from the starting point of the auger 22. Of course the slots 62 stop before reaching the seal area. The liquids which are thrown under pressure upwardly from the rotation of the auger 22 are directed against the face 64 of the flanged portion 51 and into the respective slots 62 which have the effect of interrupting and breaking up the flow of the fluid under pressure thereby reducing the concentrated pressure and flow against the rubber coated seal 60 which reduced the tendency to leak at this particular place. This makes it easier to keep the machine clean and also makes the seal 60 last longer. The flanged portion is located adjacent the product inlet 53 to assist in keeping the flow of the product in a downwardly direction in FIG. 1 rather than in an upwardly direction toward the rubber coated seal 60.

The upper end 68 of auger 22 is mounted for rotation inside of a flanged auger support 70 having a flanged portion 72 attached to the auger by means of a pin 74 and being mounted inside a thrust bearing assembly 76 having thrust bearings 78 supporting a roller bearing assembly 80 which is held in place by an end cap 82 having circular flanged portion 84 bolted in place by bolts 85 to the flanges of the product inlet sleeve 52 and also to supports 36 mounted on the vertical columns 40 by means of bolts 86.

While I have shown and described a particular preferred embodiment of this invention in detail and including a suggested mode of operation, this is by way of illustration only because there are various alterations, changes, deviations, eliminations, revisions and departures which may be made in the invention without avoiding the scope of the invention set forth in the appended claims.

What is claimed:

1. In a deboning machine for separating mixed particles of bone and meat products, such as obtained by grinding fish or chicken bones having meat thereon, comprising a machine frame, a motor mounted on said frame, a product auger having a first end and an opposed second end, said first end being driven by said motor, said auger being tapered on the outside and comprising auger blades arranged in a continuous helix for removing meat products, support means on the base for supporting said auger for rotation by said motor, bearing means for said auger, an auger housing mounted on said base and having said auger mounted therein and there being a product space between the inside of said housing and the exterior of said auger near the second end thereof, a bone outlet, a sleeve having holes therein mounted over said auger, a meat outlet, a product inlet mounted on said machines adjacent said second end of said auger and being in communication with said auger, and a seal adjacent the second end of said auger, the improvement comprising:

means adjacent the second end of said auger for directing the product mixture including fluids away from the second end of said auger and the seal and towards the first end of said auger and the product outlet.

2. The device claimed in claim 1 wherein said slots are located at an angle approximately 45° from the starting point of the auger blade.

3. The device in claim 2 wherein said slots extend transversely across the plate rather than radially inwardly toward the center of said plate.

4. The device claimed in claim 1 wherein said auger housing has a support member extending outwardly therefrom adjacent the second end of said auger, first bearing means supported on said support member about the upper second end of said auger, second bearing means supported on top of said first bearing means, a closure cap covering said first and second bearing means and the second end of said auger, and means for securing said cap to said support member.

5. The device claimed in claim 4 wherein there is a flanged member positioned on the second end of said auger and having the first bearing means located thereon, and connecting means between said auger and said flanged portion.

6. The device in claim 1 wherein there is an additional auger blade adjacent the first end of said auger and between said helical auger blades.

7. The device in claim 6 wherein said additional auger blade extends approximately 180° degrees.

8. The device in claim 6 wherein said tip of said auger blade is square.

9. The device in claim 1 wherein the tip of said auger blade near said first end is square.

10. In a method of separating mixed particles of bone and meat products, such as obtained by grinding fish or chicken bones having meat thereon, utilizing apparatus comprising a machine frame, a motor mounted on said frame, a product auger having a first end and an opposed second end, said first end being driven by said motor, said auger being tapered on the outside and comprising auger blades arranged in a continuous helix for removing meat products, support means on the base for supporting said auger for rotation by said motor, bearing means for said auger, an auger housing mounted on said base and having said auger mounted therein and there being a product space between the inside of said housing and the exterior of said auger near the second end thereof, a bone outlet, a sleeve having holes therein mounted over said auger, a meat outlet, a product inlet mounted on said machines adjacent said second end of said auger and being in communication with said auger, and a seal adjacent the second end of said auger, the improvement comprising:

directing the product mixture including fluids away from the second end of said auger and the seal and toward the first end of said auger and the product outlet by means for directing on said auger.

11. The method claimed in claim 10 wherein said slots are located at an angle approximately 45° from the starting point of the auger blades.

12. The method in claim 11 wherein said slots extend transversely across the deflecting member rather than radially inwardly toward the center of said plate.

13. The method claimed in claim 10 wherein said auger housing has a support member extending outwardly therefrom adjacent the second end of said auger, first bearing means supported on said support member about the upper second end of said auger, second bearing means supported on top of said first bearing means, a closure cap covering said first and second bearing means and the second end of said auger, and means for securing said cap to said support member.

14. The method claimed in claim 13 wherein there is a flanged member positioned on the second end of said auger and having the first bearing means located thereon, and connecting means between said auger and said flanged portion.

15. The method in claim 14 wherein there is an additional auger blade adjacent the first end of said auger and between said helical auger blades.

16. The method in claim 15 wherein said additional auger blade extends approximately 180 degrees.

17. The method in claim 16 wherein the tip of said auger near said first end is square.

18. The method in claim 10 wherein said tip of said auger is square.

* * * * *